(No Model.)

R. T. SMITH.
CAN FOR HERMETICALLY SEALED GOODS.

No. 420,116. Patented Jan. 28, 1890.

Witnesses
C. P. Pringle
G. R. Rowley

Inventor
Robert Tynes Smith
By his Attorney
Wm. L. Bailie

UNITED STATES PATENT OFFICE.

ROBERT TYNES SMITH, OF BALTIMORE, MARYLAND.

CAN FOR HERMETICALLY-SEALED GOODS.

SPECIFICATION forming part of Letters Patent No. 420,116, dated January 28, 1890.

Application filed November 15, 1889. Serial No. 330,471. (No model.)

*To all whom it may concern:*

Be it known that I, ROBERT TYNES SMITH, a citizen of the United States, residing at Baltimore, in the State of Maryland, have invented certain new and useful Improvements in Cans for Hermetically-Sealed Goods; and I do declare the following to be a full, clear, and exact description of the invention, such as will enable others skilled in the art to which it appertains to make and use the same, reference being had to the accompanying drawings, and to the figures of reference marked thereon, which form a part of this specification.

It is the present common practice in the manufacture of cans for hermetically-sealed goods to provide around the opening in the head of the can a groove of such form that with the edge thereof a properly-soldered joint may be made with the corresponding edge of the cap that covers the opening in the said head. The usual manner of soldering this cap to the head is to place a piece of solder, in either the lump or wire form, over the joint to be soldered and then by the proper movement of a hot soldering-iron distribute and sweat the solder in this joint between the head and the cap. This manner of operating is, however, attained with considerable waste of solder and with the uncertainty of properly sweating the solder in the joint in consequence of any imperfection in the tinning of the metal or of the presence of any dirt in the seam; and the object of my invention is to provide in the manufacture of the can against such contingencies by thoroughly tinning the groove in the can-head and properly distributing and soldering thereto a sufficient quantity of solder, whereby when the cap is to be sealed thereto the entire operation may be performed without the use of additional solder and thereby insure a thorough sweating of the joint, all of which I accomplish in the manner hereinafter fully described and claimed, reference being had to the accompanying drawings, in which—

Figure 1:
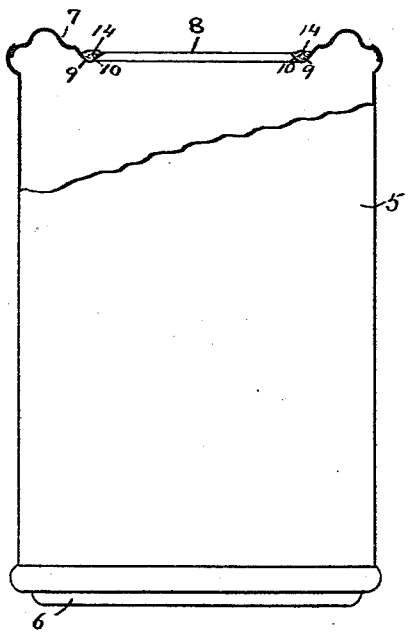
Figure 2:
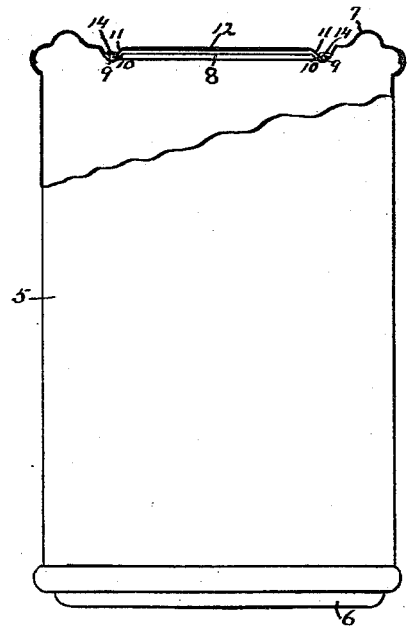
Figure 3:
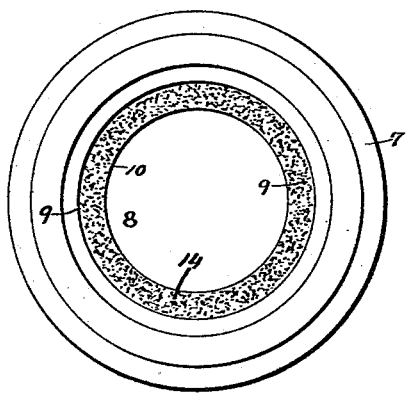

Figure 1 shows a side elevation of a can with the solder-prepared groove, the head shown in section and without the cap. Fig. 2 shows the same device shown in Fig. 1, with the cap thereon. Fig. 3 shows a view looking down on the device shown in Fig. 1.

The same numbers refer to the same or similar parts in the several views.

The number 5 denotes the body of the can, that is of common cylindrical form, its lower head 6 being solid and its upper head 7 having therein the openings 8, through which the material to be preserved is placed in the can. In this upper head 7 and around the edge of the opening 8 is formed the groove 9, of the form and in the position shown in the drawings, the inner edge 10 of this groove conforming in shape to the bent edge 11 of the cap 12, whereby these edges 10 and 11 will properly lap and provide the soldering-surface to make this joint air-tight and of sufficient strength to stand the pressure to which the can may be subjected. As previously stated, it is the present common practice to solder this cap 12 to the head 7, and thus hermetically seal the opening 8 by placing a piece of solder of any form over the joint to be soldered, and then with the heated soldering-iron cause this solder to be distributed around the groove 9 and sweated in the joint between the head and the cap. In the manufacture of the can it is endeavored to make the edge 10 of the groove and the bent edge 11 of the cap conform one to the other in shape as nearly as possible, as before stated. While this manner of making the can and soldering the cap thereon lessens the chances of leaks, when the can is in proper condition it does not provide for nor will it permit a proper joint to be made between the cap 12 and the head 7 should the tinning thereof be imperfect or any foreign matter be therebetween that would prevent the flow and adherence of the solder. In order to overcome these troubles and insure a perfect tinning of these surfaces of the head and cap that are to be united, the groove 9 is thoroughly retinned during the process of manufacture of the can and has soldered therein a sufficient quantity of solder 14 so as to become combined with the tin, whereby when the cap 12 is placed in position over the opening 8 there will be just sufficient of this solder 14 distributed over the groove 9 to seal the cap to the head of the can by the sole operation of the heated iron and without additional solder. Where machinery is employed to do this capping of the cans it is very necessary that the metal be properly tinned and that the solder should be properly distributed throughout the groove 9. These conditions are acquired by my manner of distributing and securing the solder in proper position in the groove 9 during the process of manufacture of the can, requiring only the use of the soldering-iron to complete the work of sealing the can with the least possible expenditure of the solder.

Having described my invention and the manner of operating, what I claim, and desire to secure by United States Letters Patent, is—

As a new article of manufacture, a metal can having an opening in one of the heads, a groove formed around said opening, and a coating of solder melted and combined with the tin-surface coating in said groove to receive the edge of the cap or cover and be united therewith by the soldering in the sealing of the can, substantially as specified.

In testimony whereof I affix my signature in presence of two witnesses.

ROBERT TYNES SMITH.

Witnesses:
WM. L. BAILIE,
JNO. T. MADDOX.